US012345193B2

(12) United States Patent
Schoenhaber et al.

(10) Patent No.: US 12,345,193 B2
(45) Date of Patent: Jul. 1, 2025

(54) EXHAUST GAS PURIFICATION SYSTEM FOR A GASOLINE ENGINE

(71) Applicant: UMICORE AG & CO. KG, Hanau-Wolfgang (DE)

(72) Inventors: Jan Schoenhaber, Darmstadt (DE); Joerg-Michael Richter, Frankfurt (DE); Carolin Braun, Langen (DE)

(73) Assignee: UMICORE AG & CO. KG, Hanau-Wolfgang (DE)

(*) Notice: Subject to any disclaimer, the term of this patent is extended or adjusted under 35 U.S.C. 154(b) by 22 days.

(21) Appl. No.: 18/344,352

(22) Filed: Jun. 29, 2023

(65) Prior Publication Data

US 2023/0340899 A1    Oct. 26, 2023

Related U.S. Application Data

(63) Continuation of application No. 17/282,859, filed as application No. PCT/EP2019/078185 on Oct. 17, 2019, now Pat. No. 11,732,631.

(30) Foreign Application Priority Data

Oct. 18, 2018   (EP) ..................................... 18201088

(51) Int. Cl.
F01N 3/28    (2006.01)
B01D 53/94   (2006.01)
B01J 23/46   (2006.01)
F01N 3/021   (2006.01)
F01N 3/10    (2006.01)

(52) U.S. Cl.
CPC ......... F01N 3/2803 (2013.01); B01D 53/945 (2013.01); B01D 53/9477 (2013.01); B01J 23/464 (2013.01); F01N 3/021 (2013.01); F01N 3/101 (2013.01); F01N 3/105 (2013.01); B01D 2255/1023 (2013.01); B01D 2255/1025 (2013.01); B01D 2255/908 (2013.01); F01N 2370/02 (2013.01)

(58) Field of Classification Search
CPC .... B01D 2255/1023; B01D 2255/1025; B01D 2255/908; B01D 2258/014; B01D 53/945; B01D 53/9477; B01J 23/464; Y02T 10/12; F01N 2370/02; F01N 3/021; F01N 3/035; F01N 3/101; F01N 3/105; F01N 3/2803
See application file for complete search history.

(56) References Cited

U.S. PATENT DOCUMENTS

| | | | |
|---|---|---|---|
| 7,922,987 B2 | 4/2011 | Koegel et al. | |
| 8,173,087 B2 | 5/2012 | Wei et al. | |
| 8,341,947 B2 | 1/2013 | Hepburn et al. | |
| 8,359,839 B2 | 1/2013 | Van Nieuwstadt et al. | |
| 8,464,522 B2 | 6/2013 | Fujiwara et al. | |
| 10,625,243 B2 | 4/2020 | Clowe et al. | |
| 10,626,814 B2 | 4/2020 | Akutsu et al. | |
| 11,377,993 B2 | 7/2022 | Schoenhaber et al. | |
| 11,547,969 B2 | 1/2023 | Schoenhaber et al. | |
| 11,614,015 B2 | 3/2023 | Schoenhaber et al. | |
| 11,649,753 B2 | 5/2023 | Schoenhaber et al. | |
| 11,732,631 B2 | 8/2023 | Schoenhaber et al. | |
| 2009/0193796 A1 | 8/2009 | Wei et al. | |
| 2009/0260349 A1 | 10/2009 | Gandhi et al. | |
| 2010/0011749 A1 | 1/2010 | Fujiwara et al. | |
| 2010/0192543 A1 | 8/2010 | Fujiwara et al. | |
| 2010/0205942 A1 | 8/2010 | Fujiwara et al. | |
| 2010/0275579 A1 | 11/2010 | Klingmann et al. | |
| 2011/0072784 A1 | 3/2011 | Hepburn et al. | |
| 2011/0120089 A1 | 5/2011 | Koch et al. | |
| 2011/0252773 A1 | 10/2011 | Arnold et al. | |
| 2014/0234189 A1 | 8/2014 | Clowes et al. | |
| 2014/0301924 A1 | 10/2014 | Morgan | |
| 2014/0356240 A1 | 12/2014 | Warner et al. | |
| 2015/0107228 A1 | 4/2015 | Klingmann et al. | |
| 2016/0121267 A1 | 5/2016 | Schoenhaber et al. | |
| 2016/0201534 A1 | 7/2016 | Lambert et al. | |
| 2016/0367973 A1 | 12/2016 | Larsson et al. | |
| 2017/0274321 A1 | 9/2017 | Zheng et al. | |
| 2018/0111088 A1 | 4/2018 | Li et al. | |
| 2018/0195425 A1 | 7/2018 | Li et al. | |
| 2020/0271031 A1 | 8/2020 | Chen et al. | |
| 2021/0324774 A1 | 10/2021 | Schoenhaber et al. | |

(Continued)

FOREIGN PATENT DOCUMENTS

CN    101516502 A    8/2009
CN    101617106 A    12/2009
(Continued)

OTHER PUBLICATIONS

International Search Report for PCT/EP2019/078185 dated Nov. 15, 2019 (5 pages).
Written Opinion of the International Searching Authority for PCT/EP2019/078185 dated Nov. 15, 2019 (6 pages).
Autoabgaskatalysatoren, "Grundlagen—Herstellung—Entwicklung—Recycling—Okologie", Christian Hagelüken, 2nd ed. 2005, p. 62.
International Preliminary Report on Patentability dated Apr. 14, 2021 for International Patent Application No. PCT/EP2019/078185 (7 pages).
European Examination Report dated May 9, 2019 for European Patent Application No. 18201088.4 (5 pages).
(Continued)

Primary Examiner — Phutthiwat Wongwian
Assistant Examiner — Diem T Tran
(74) Attorney, Agent, or Firm — Smith, Gambrell & Russell, LLP

(57) ABSTRACT

Subject of the invention is an exhaust gas purification system for a gasoline engine, comprising in consecutive order the following devices:
a first three-way-catalyst (TWC1), a gasoline particulate filter (GPF) and a second three-way-catalyst (TWC2), wherein the platinum-group metal concentration (PGM) of the TWC2 is greater than the PGM of the GPF, wherein the PGM is determined in g/ft3 of the volume of the device.
The invention also relates to methods in which the system is used and uses of the system.

23 Claims, No Drawings

(56) References Cited

U.S. PATENT DOCUMENTS

| | | | |
|---|---|---|---|
| 2021/0332731 A1 | 10/2021 | Schoenhaber et al. |
| 2021/0348537 A1 | 11/2021 | Schoenhaber et al. |
| 2021/0379529 A1 | 12/2021 | Schoenhaber et al. |
| 2021/0381415 A1 | 12/2021 | Schoenhaber et al. |
| 2021/0388748 A1 | 12/2021 | Schoenhaber et al. |
| 2022/0003139 A1 | 1/2022 | Schoenhaber et al. |

FOREIGN PATENT DOCUMENTS

| | | | |
|---|---|---|---|
| CN | 102251831 A | 11/2011 |
| CN | 102939445 A | 2/2013 |
| CN | 108602050 A | 9/2018 |
| CN | 108612593 A | 10/2018 |
| DE | 10 2010 046 762 A1 | 3/2011 |
| DE | 10 2013 018 208 A1 | 4/2015 |
| DE | 10 2015 212 514 A1 | 1/2017 |
| DE | 10 2017 101 177 A1 | 7/2018 |
| DE | 10 2017 205 664 A1 | 10/2018 |
| JP | 2010-048131 A | 3/2010 |
| JP | 2015-025434 A | 2/2015 |
| KR | 2010 0 125 291 A | 11/2010 |
| WO | 2010/052055 A1 | 5/2010 |
| WO | 2010/096641 A1 | 8/2010 |
| WO | 2017/004414 A1 | 1/2017 |
| WO | 2020/079131 A1 | 4/2020 |
| WO | 2020/079134 A1 | 4/2020 |
| WO | 2020/079136 A1 | 4/2020 |
| WO | 2020/079137 A1 | 4/2020 |
| WO | 2020/079140 A1 | 4/2020 |
| WO | 2020/079141 A1 | 4/2020 |
| WO | 2020/079143 A1 | 4/2020 |

OTHER PUBLICATIONS

European Search Report dated Apr. 18, 2019 for European Patent Application No. 18201088.4 (5 pages).
Translation of Japanese Publication No. 2010-048131 published Mar. 4, 2010 (29 pages).
Non Final Office Action Received in U.S. Appl. No. 17/283,344 dated Dec. 9, 2021 (7 pages).
Non Final Office Action Received in U.S. Appl. No. 17/283,743 dated Feb. 23, 2022 (10 pages).
Notice of Allowance and Fees Due Received in U.S. Appl. No. 17/283,344 dated Mar. 23, 2022 (7 pages).
Non Final Office Action Received in U.S. Appl. No. 17/283,335 dated Apr. 4, 2022 (14 pages).
Non Final Office Action Received in U.S. Appl. No. 17/284,041 dated Mar. 18, 2022 (10 pages).
Non Final Office Action Received in U.S. Appl. No. 17/284,055 dated Jun. 8, 2022 (13 pages).
Non Final Office Action mailed Oct. 14, 2022 in U.S. Appl. No. 17/283,335 (10 Pages).
Final Office Action mailed Oct. 5, 2022 in U.S. Appl. No. 17/284,041 (12 Pages).
Notice of Allowance mailed Sep. 2, 2022 in U.S. Appl. No. 17/283,743 (7 Pages).
Non Final Office Action mailed Mar. 14, 2023 in U.S. Appl. No. 17/283,335 (14 Pages).
Notice of Allowance and Fees Due Received in U.S. Appl. No. 17/282,859 dated Apr. 5, 2023 (8 pages).
Final Office Action mailed Feb. 28, 2023 in U.S. Appl. No. 17/282,859 (8 Pages).
Non-Final Office Action mailed Aug. 11, 2022 in U.S. Appl. No. 17/282,859 (6 Pages).
Non-Final Office Action mailed Jan. 28, 2022 in U.S. Appl. No. 17/282,859 (10 Pages).
Notice of Allowance and Fees Due Received in U.S. Appl. No. 17/284,055 dated Jan. 6, 2023 (9 pages).
First Office Action and Search Report mailed Feb. 16, 2023 for Chinese Patent Application No. 201980068335.8 (5 Pages in Chinese; 3 pages search report; 5 pages English translation).
Second Office Action mailed Jun. 22, 2023 for Chinese Patent Application No. 201980068335.8 (4 Pages in Chinese; 6 pages English translation).
Notice of Allowance and Fees Due mailed May 2, 2024 in U.S. Appl. No. 17/283,729 (9 pages).
Search Report mailed Apr. 18, 2019 for European Patent Application No. 18201088.4 (5 pages).
Communication mailed May 9, 2019 for European Patent Application No. 18201088.4 (5 pages).
Communication mailed May 2, 2022 for European Patent Application No. 18201088.4 (5 pages).
Non-Final Office Action mailed Dec. 5, 2023 in U.S. Appl. No. 17/283,729 (8 Pages).
Notice of Allowance and Fees Due and Interview Summary mailed Aug. 22, 2023 in U.S. Appl. No. 17/283,335 (10 pages).

EXHAUST GAS PURIFICATION SYSTEM FOR A GASOLINE ENGINE

The invention relates to an exhaust gas purification system for a gasoline engine, comprising in consecutive order a first three-way-catalyst, a gasoline particulate filter and a second three-way-catalyst. The invention also relates to methods and uses thereof.

STATE OF THE ART

Exhaust gas from gasoline engines comprises pollutants which have to be removed before the exhaust gas is released into the environment. The most relevant pollutants in this regard are nitrogen oxides ($NO_x$), hydrocarbons (HC or THC), carbon monoxide (CO) and particulate matter, especially soot. Other pollutants comprise sulfur oxides ($SO_x$) and volatile organic compounds (VOC). Such gaseous pollutants are removed from the exhaust gas by catalyst system and devices located downstream of the engine. Typically, such systems comprise a three-way catalyst (TWC), which is capable of removing nitric oxides, hydrocarbons and carbon monoxide.

In recent years, there has been increasing attention on the removal of particulate matter, and especially soot, from exhaust gas from gasoline engines. For many years, soot particles were only removed from diesel engine exhaust gas. However, there is growing evidence that also fine soot particles from gasoline engines can impair health. Therefore, there is a strong tendency to equip exhaust gas purification systems for gasoline engines with gasoline particulate filters (GPF). The GPF should efficiently reduce the particle mass (PM) and the particle number (PN) of the exhaust gas. In the European Union, the standard EURO 6 dated September 2014 defines for the first time maximum levels for particulate matter of gasoline engines of passenger vehicles.

Presently, there are increasing demands by public authorities on manufacturers of vehicles and gasoline engines to improve exhaust gas purity. There is a worldwide trend towards lower legal thresholds for emission levels of such pollutants. Moreover, the European Union plans to introduce obligatory tests for vehicles under real conditions with portable emissions measurement systems under the designation Real Driving Emissions (RDE). Such demands exert high pressure on manufacturers to provide exhaust gas purification systems which fulfill all legal standards. In this regard, it is a known problem that the amount and ratio of exhaust gas pollutants can vary significantly depending on the operation conditions of the engine. Vehicle exhaust gas purification systems should be efficient under conditions as different as urban traffic, long-distance traffic, low or high velocity, cold or hot environment, and cautious or offensive driving.

It is another problem that a gasoline engine should have low fuel consumption in order to keep carbon dioxide emissions low. Carbon dioxide is considered to be the main cause of the greenhouse effect and global warming. Thus, attempts to increase exhaust gas purity should not negatively affect the performance of the gasoline engine.

It is a general problem that when a catalyst device, such as a TWC, is combined with a GPF in purifying exhaust gas from a gasoline engine, it is difficult to achieve an efficient depletion of all relevant pollutants whilst maintaining a high performance of the gasoline engine. The reason is that three different properties of the exhaust gas purification system, which are at least in part antagonistic, have to be brought into accordance with each other. Accordingly, the system should have high catalytic activity, high filtration efficiency and low pressure drop. High filtration efficiency is required for efficient removal of particles. High catalytic activity is required for efficient depletion of gaseous pollutants, such as HC, $NO_x$ and CO. Low pressure drop is required for maintaining a high engine performance. In contrast, an increasing pressure drop tends to reduce the efficiency of the engine, which leads to higher fuel consumption and carbon dioxide emission.

It is a general problem that a GPF and catalytic devices require high temperatures for efficient operation. Therefore, they have to be operated close to the engine, which leads to dimensional limitations of the overall exhaust gas purification system. In order to increase the filtration efficiency or catalytic activity of an exhaust gas purification system, more catalyst material and filtration means are required. In the limited space of the catalytic system, this is generally associated with an increase of pressure drop in the GPF and in catalytic devices. The reason is that the exhaust gas is attenuated when passing filtering material and porous coatings in such devices. Consequently, the efficiency of the gasoline engine has to be reduced and more carbon dioxide is emitted for achieving a comparable performance. On the other hand, if the pressure drop is kept low, it is difficult to achieve a good filtration efficiency and high catalytic activity in the limited space of the exhaust gas purification system.

Various attempts have been made in the prior art to provide gasoline engine purification systems, which overcome the above-mentioned problems. For example, various catalytic devices and gasoline particulate filters have been described, which are equipped with specific catalysts or combination of catalysts. In this regard, catalysts can be provided with special combinations of metals or catalyst layers. Other solutions focus on the internal structure or specific physical properties of such devices.

Further, exhaust gas purification systems with special arrangements of multiple devices have been proposed for increased efficiency. For example, DE 10 2015 212 514 A1 suggests a combination of two consecutive TWC and a GPF located downstream of the second TWC. WO 2010/052055 A1 also discloses a combination of a first TWC, a second downstream TWC and a GPF further downstream. It is a problem of such systems that when the terminal GPF is regenerated and the stored soot is burned, new pollutants such as CO and HC can be formed and emitted into the environment. It is another problem that the terminal GPF is located relatively far from the engine. Therefore, it cannot be heated rapidly and efficiently by the engine exhaust gas to achieve the optimal process temperature. Moreover, it is difficult to achieve the high regeneration temperature required for efficient soot burning, so an active regeneration has to be triggered. Generally, operation of a GPF at a low, non-optimal temperature reduces the efficiency and increases the amounts of residual pollutants. Therefore, the performance of such systems could still be improved.

WO 2017/004414 A1 discloses various systems for purifying exhaust gas from gasoline engines comprising $N_2O$ removal catalysts. For example, an upstream TWC is coupled with downstream devices, such as a GPF and the $N_2O$ removal catalyst. However, the terminal catalytic device is for $N_2O$ removal and cannot efficiently remove pollutants formed in the upstream GPF, such as CO and CH. The data provided in the document also indicates that the overall performance could still be improved.

WO 2010/096641 A1 also discloses a combination of an upstream TWC which is close-coupled to a gasoline engine, a downstream particulate matter control device and a downstream $NO_x$ control system. However, the terminal catalytic device focusses on $NO_x$ removal and cannot efficiently remove the most relevant pollutants from the upstream GPF, for example those which are formed during regeneration of the GPF. Overall, the performance of the system could still be improved.

Overall, there is a continuous need for providing exhaust gas purification systems for gasoline engines, which overcome the above-mentioned problems.

Problem Underlying the Invention

It is a problem underlying the invention to provide an exhaust gas purification system for gasoline engines which overcome the above-mentioned problems.

Specifically, an exhaust gas purification system for gasoline engines shall be provided, which efficiently removes the relevant pollutants, and especially $NO_x$, hydrocarbons (HC), carbon monoxide and particulate matter, especially soot. The filtration efficiency for soot should be high with regard to particle mass as well as particle number. At the same time, the pressure drop of the system should be low, such that the engine can maintain a high performance and carbon dioxide emissions will not increase.

It is a special problem to provide an exhaust gas purification system for gasoline engines, which is efficient under various different operation conditions. Therefore, the level of pollutants shall be low also under RDE conditions.

Further, routine monitoring of the system by on board diagnosis (OBD system) should be convenient and provide appropriate results.

It is a further problem underlying the invention to provide a system which has high purification efficiency, but is relatively simple and usable in standard automobile applications. The system should be relatively compact, stable and convenient to manufacture and use.

DISCLOSURE OF THE INVENTION

Surprisingly, it was found that the problem underlying the invention is solved by an exhaust gas purification system according to the claims. Further embodiments of the invention are outlined throughout the description.

Subject of the invention is an exhaust gas purification system for a gasoline engine, comprising in consecutive order the following devices:

a first three-way-catalyst (TWC1), a gasoline particulate filter (GPF) and a second three-way-catalyst (TWC2), wherein the platinum-group metal concentration (PGM) of the TWC2 is greater than the PGM of the GPF, wherein the PGM is determined in g/ft3 of the volume of the device.

The invention relates to an exhaust gas purification system for a gasoline engine. A gasoline engine is a combustion engine, which uses petrol (gasoline) as fuel. A gasoline engine is different from a diesel engine, which does not use spark ignition. Generally, exhaust gas emitted from gasoline engines has a different composition than exhaust gas from diesel engines and requires different exhaust gas purification systems.

Preferably, the engine uses gasoline direct injection (GDI), also known as petrol direct injection, because these engines are known for their improved fuel efficiency. Typically, the exhaust gas from such an engine comprises a relatively high number of relatively small soot particles. Especially for such an engine, it can be advantageous that the system is capable of efficient removal of soot particles.

The purification system comprises the three devices as outlined above. Typically, the devices are different units, which can be provided in separate housings. The devices can be connected by connection means, such as tubes and/or plugs. The three devices are arranged in consecutive order, such that the TWC1 is located upstream from the GPF, which is located upstream from the TWC2. The TWC1 is positioned downstream from the gasoline engine. As used herein, the terms "upstream" and "downstream" refer to the directions of the flow of the engine exhaust gas stream from the engine towards the exhaust pipe, with the engine in an upstream location and the exhaust pipe downstream.

The exhaust gas purification system comprises at least the three purification devices TWC1, GPF and TWC2. In a preferred embodiment, the system does not comprise other purification devices, especially not additional catalytic devices. More preferably, the system does not comprise another TWC, another GPF and/or another pollutant removal device, such as a separate $NO_x$ removal device or the like. According to the invention, it was found that efficient exhaust gas purification is possible only with the three devices in the order described herein.

In another embodiment, the system comprises additional devices which participate in pollutant removal. In one embodiment, at least one additional catalyst device may be present. In another embodiment, at least one additional non-catalytic device may be present.

A TWC comprises a three way catalyst coating which is coated on a flow-through substrate. The term "three-way" refers to the function of three-way conversion, where hydrocarbons, carbon monoxide, and nitrogen oxides are substantially simultaneously converted. Three-way-catalysts (TWC) are known and widely used in the art. A gasoline engine typically operates under near stoichiometric reaction conditions that oscillate or are perturbated slightly between fuel-rich and fuel-lean air to fuel ratios (A/F ratios) ($\lambda=1+/-$ ~0.01), at perturbation frequencies of 0.5 Hz to 2 Hz. This mode of operation is also referred to as "perturbated stoichiometric" reaction conditions. TWC catalysts include oxygen storage materials (OSM) such as ceria that have multivalent states which allows oxygen to be held and released under varying air to fuel ratios. Under rich conditions, when $NO_x$ is being reduced, the oxygen storage capacity (OSC) provides a small amount of oxygen to consume unreacted CO and HC. Likewise, under lean conditions when CO and HC are being oxidized, the OSM reacts with excess oxygen and/or $NO_x$. As a result, even in the presence of an atmosphere that oscillates between fuel-rich and fuel-lean air to fuel ratios, there is conversion of HC, CO, and $NO_x$ all at the same (or at essentially all the same) time. Typically, a TWC catalyst comprises one or more platinum group metals such as palladium and/or rhodium and optionally platinum; an oxygen storage component; and optionally promoters and/or stabilizers. Under rich conditions, TWC catalysts may generate ammonia.

The term "platinum group metal" refers to the six platinum-group metals ruthenium, rhodium, palladium, osmium, iridium, and platinum.

A "gasoline particulate filter" (GPF) is a device for removing particulate matter, especially soot, from exhaust gas. The GPF is a wall-flow filter. In such a device, the exhaust gas passes the filter walls inside the device, whereas the particles are not capable of passing the filter walls and accumulate inside the device. Typically, the filters comprise multiple parallel gas-flow channels. A plurality of first channels is open at the upstream side from which the exhaust gas streams into the channels, and closed at the opposite end in flow direction. The exhaust gas enters the first channels, passes the filter walls and enters adjacent second channels, whereas the particles remain trapped in the first channels. The second channels are closed at the upstream end and open at the opposite end downstream in flow direction, such that the exhaust gas exits the GPF.

Typically, the GPF comprises a catalytically active coating, typically a TWC coating. Thereby, the overall catalytic efficiency of the overall system can be enhanced and the performance can be increased. Typically, inner surfaces of the GPF, preferably all inner surfaces, are coated with a catalyst coating. Thus, inner walls of the filter channels or at least portions thereof comprise a catalyst coating, such that the exhaust gas which passes the filter walls also flows through the porous catalyst coating. Typically, the catalytic coating is located inside the porous filter walls, or onto the filter walls, or both, inside and onto the filter walls. Thereby, the GPF can filter off particles, and at the same time removes gaseous pollutants by catalytic chemical reaction. The catalyst may also support removal of particles, especially during regeneration.

A "wash coat" (WC) is a thin, adherent coating of a catalytic or other material applied to a carrier substrate. The carrier substrate can be a honeycomb flow through monolith substrate or a filter substrate, which is sufficiently porous to permit the passage of the gas stream being treated. A "wash coat layer" is defined as a coating that comprises support particles. A catalyzed wash coat comprises additional catalytic components. The wash coats of the TWC1 and TWC2 of the system are catalytic washcoats. Further, it is preferred that the GPF comprises a catalytic washcoat.

According to this application, the wash coat load is determined in g/l, wherein the weight in gram corresponds to all solids in the wash coat, whereas the volume is the total volume of the device, and not only the void volume of the device in the channels.

A "carrier" is a support, typically a monolithic substrate, examples of which include, but are not limited to, honeycomb flow-through substrates for the TWC and wall-flow filter substrates for the GPF. A "monolithic substrate" is a unitary structure that is homogeneous and continuous and has not been formed by affixing separate substrate pieces together. Typically, the carrier is coated with a wash coat comprising the catalyst.

An "OSM" refers to an oxygen storage material, which is an entity that has multivalent oxidation states and can actively react with oxidants such as oxygen or nitric oxide ($NO_2$) under oxidative conditions, or reacts with reductants such as carbon monoxide (CO) or hydrogen under reduction conditions. Examples of suitable oxygen storage materials include ceria or praseodymia. Delivery of an OSM to the wash coat layer can be achieved by the use of, for example, mixed oxides. For example, ceria can be delivered as an oxide of cerium and/or zirconium and mixtures thereof, and/or a mixed oxide of cerium, zirconium, and further dopants like rare earth elements, like Nd, Pr or Y.

As used herein, the "volume" of a device, such as a TWC or GPF, is the total volume of the device defined by its outer dimensions. Thus, the volume is not only the void volume within the channels or within the porous structure of the device.

Preferably, the OSC is determined in fresh condition. The presence or absence of oxygen storage capacity (OSC) can be determined by a jump test. Thereby, the OSC in mg/L of a catalyst or system that is located between two λ-sensors is calculated by the time offset of the two sensor signals that is occurring after air-to-fuel ratio jumps (e.g. between λ 0.95-1.05; see for example "Autoabgaskatalysatoren, Grundlagen-Herstellung-Entwicklung-Recycling-Ökologie", Christian Hagelüken, $2^{nd}$ ed. 2005, page 62). The catalyst is in fresh condition when it is put into use after manufacture.

Typically, the catalytic performance changes during operation and its performance may decrease. This phenomenon is known as aging. Thus, it is preferred that the general catalyst performance is determined in aged condition, as it is required by legislation.

According to the invention, the system comprises a TWC1, a GPF and a TWC2 in consecutive order. Such an arrangement of these three devices confers various advantages to the inventive system.

It is an advantage of the system that the GPF can be positioned relatively close to the engine. Generally, GPFs require a relatively high temperature for optimal performance and efficient regeneration. When the engine is started, the GPF is heated by the exhaust gas stream. When the GPF is located close to the engine, it is heated faster and achieves the high, optimal operation temperature earlier. The time window in which the filter is not operated efficiently is relatively small. In conventional systems, in which the GPF is a terminal device and/or located further away from the engine, more time is required for achieving the operation temperature for efficient three-way catalyst activity and soot oxidation.

Moreover, a GPF must be regenerated actively at defined time intervals if it is located too far from the engine and therefore does not reach the temperature that is required for soot burning. During regeneration, accumulated soot is burned at high temperature. If the required temperature cannot be reached, the soot may not be burned completely and undesired side products, such as CO and hydrocarbons, can be formed in the regeneration process. Therefore, it is advantageous for efficient regeneration that the GPF is located relatively close to the engine.

It is another advantage of the system that the partially purified exhaust gas, which is released from the GPF, can be subjected to further purification by the downstream second TWC (TWC2). In known systems, the GPF is often the terminal purification device for final removal of particles from pre-purified exhaust gas. When the GPF is regenerated, the soot is oxidized and impurities, such as carbon monoxide (CO) or hydrocarbons (CH), can be formed. With a conventional system comprising a terminal GPF, pollutants formed during regeneration are released into the environment. According to the invention, the pre-purified exhaust gas from the GPF is subjected to downstream purification in the TWC2. Thereby, residual impurities which pass the GPF or which are formed in the GPF can be removed or at least significantly reduced. The terminal TWC2 can ensure a final catalytic purification, which can function as a finishing step in the overall purification process.

It is a further advantage of the system that the TWC2 is located at a position distant from the engine. It is a known problem in the technical field that catalytic devices, such as TWCs, undergo aging during use. Aging means that the activity and performance of the catalyst changes over lifetime, and usually tends to decrease. Generally, aging occurs more rapidly at high temperature. In the inventive system, the TWC2 is positioned relatively far from the engine, which has the consequence that less heat is transferred to the TWC2 than to the upstream devices during use. Therefore, the aging process of the TWC2 is comparably slow and the catalyst can maintain its efficiency and performance for a prolonged time. This can be advantageous for long-time use, especially when emissions are monitored under RDE conditions. On the other hand, since the TWC2 is only the final catalyst for removing residual pollutants from the pre-purified exhaust gas, it can be acceptable that its performance may not be optimal at certain time intervals due to its position relatively far from the engine. The terminal downstream TWC2 can still efficiently clean up the relatively small amounts of residual pollutants, even at times when its temperature should not be as high as required for optimal function.

Overall, the system with the special arrangement of the TWC1, GPF and TWC2 allows highly efficient removal of gaseous and particulate pollutants from gasoline engine exhaust gas during standard use and for a prolonged time.

According to the invention, the platinum-group metal concentration (PGM) of the TWC2 is greater than the PGM of the GPF, wherein the PGM is determined in g/ft3 of the volume of the device. It can be advantageous to adjust the PGM of the TWC2 relatively high compared to the PGM of the GPF. The TWC2 is located at a position which is relatively far from the engine. During operation, the TWC2 will require more time to reach a high temperature compared to the TWC1 or GPF. Overall, the TWC2 will be operated at lower temperatures on average, which means that the catalytic efficiency may be lower at least at certain time intervals. However, the lower temperature also has the consequence that the TWC2 will be less affected by aging and concomitant loss of catalytic efficiency. In the overall system, it can therefore be advantageous to combine a TWC1 at a position close to the engine and the GPF, with the TWC2 at a position most remote from the gasoline engine, wherein the TWC2 is provided with a relatively high amount of catalyst. The TWC1 can provide an initial high catalytic efficiency and performance. The terminal TWC2 provides a final catalytic purification, which can be regarded as a finishing in the overall purification process. Overall, it can be advantageous that the final purification with the TWC2 is relatively efficient, stable and continuous, because the TWC2 is not significantly affected by aging and provided with a relatively high amount of catalyst.

In a preferred embodiment, the ratio of the platinum-group metal concentration (PGM) of the TWC1 to the PGM of the TWC2 is from 1.1 to 10, preferably from 1.25 to 9, more preferably from 1.45 to 5, wherein the PGM is determined in g/ft3 of the volume of the device. Accordingly, the TWC1 can have an initial high catalytic efficiency and performance, whilst the terminal TWC2 provides a final catalytic purification, which can be regarded as a finishing in the overall purification process. Thereby, an advantageous balance of catalytic performances between the TWC1 and TWC2 can be achieved, which allows an efficient distribution and optimal use of expensive precious metals.

Further, a higher PGM of the TWC1 compared to the TWC2 can be advantageous, because the diagnosis capability of the system can be improved. Especially during on-board diagnosis, the catalytic performance is commonly carried out by monitoring the first catalytic device in the system. When the catalytic performance of the TWC1 is relatively high, on-board diagnosis can provide relatively good approximate results when monitoring only the TWC1. Thereby, a relatively good correlation of the diagnosis result with real driving emissions is possible.

In a preferred embodiment, the platinum-group metal concentration (PGM) of the TWC1 is at least 40% greater than the PGM of the TWC2, wherein the PGM is determined in g/ft3 of the volume of the device. When the PGM of the TWC1 is significantly higher than of the TWC2, the advantages described above regarding overall catalytic efficiency, final finishing, cost efficacy and diagnosis capability can especially be obtained.

In a preferred embodiment, the platinum-group metal concentration (PGM) of the TWC1 is greater than the sum of the PGM of the GPF and TWC2, wherein the PGM is determined in g/ft3 of the volume of the device. When the PGM of the TWC1 is adjusted accordingly, the overall system can especially have a high catalytic efficiency under non-optimal conditions. Since the TWC1 is located closer to the engine than the GPF and TWC2, it can reach its optimal high operating temperature more rapidly and for longer time periods, and has a higher relative catalytic performance. Therefore, it can be advantageous that a relatively high portion of the overall catalytic activity of the total system is concentrated in the TWC1, whilst a significantly lower portion of the catalytic activity is located in the GPF and TWC2. Overall, this can be acceptable, because the GPF is in contact with the pre-purified exhaust gas from the TWC1, which comprises significantly less gaseous pollutants than the original exhaust gas. Moreover, the TWC2 is only in contact with the pre-purified exhaust gas from the GPF, which only comprises residual, relatively small amounts of gaseous pollutants. Overall, a system can be provided in which the PGM is distributed between the three devices, such that gaseous and particulate pollutants are efficiently removed whilst the pressure drop is kept low and engine performance is maintained.

In a preferred embodiment, the total amount of platinum-group metal of the TWC1 is from 1 g to 15 g, preferably from 2 g to 10 g. In a preferred embodiment, the total amount of platinum-group metal of the GPF is from 0 g to 5 g, preferably from 0.05 g to 5 g, more preferably from 1 g to 3 g.

In a preferred embodiment, the total amount of platinum-group metal of the TWC2 is from 0.1 g to 8 g, preferably from 0.2 g to 6 g. Overall, an efficient removal of pollutants can be achieved with the system when the total amount of platinum group metal is adjusted and distributed accordingly.

In a preferred embodiment, the TWC1 comprises palladium and/or rhodium. In a preferred embodiment, the TWC2 comprises palladium and/or rhodium. Rhodium is especially efficient in removing $NO_x$, whereas palladium is especially efficient in removing CO. Therefore, the use of these metals in these devices can be advantageous for efficient overall removal of pollutants from the exhaust gas.

In a preferred embodiment, the percentage of rhodium of the total amount of platinum-group metal of the TWC2 is at least 10 wt. %, more preferably at least 20 wt. %. This can be advantageous for efficiently removing $NO_x$ by the TWC2.

In a preferred embodiment, the TWC2 does not comprise platinum. It can be advantageous that the use of expensive platinum can be avoided in the TWC2, whilst an overall efficient removal of pollutants can be achieved.

In a preferred embodiment, the wash coat load (WCL) of the TWC2 is greater than the WCL of the GPF, wherein the WCL is determined in g/l of the volume of the device.

Generally, a high WCL in the GPF can lead to a high pressure drop, because the exhaust gas has to pass the inner filter walls of the GPF and the catalytic wash coat on the filter walls. According to the invention, it can be advantageous that the WCL of the GPF is relatively low, because the pressure drop of the GPF, and therefore of the whole exhaust gas purification system, can be kept low. In contrast, the exhaust gas usually does not traverse the filter walls of a three way catalyst device. Thus, additional wash coat in the TWC2 will generally not provide a comparable decrease of pressure drop as in the GPF. However, it is preferred that the GPF is provided with a wash coat having catalytic activity. Overall, an efficient overall system can be provided having high catalytic efficiency and low pressure drop.

Further, a significant WCL of the TWC2 can be advantageous, because it can provide an efficient removal of all residual pollutants from the pre-purified exhaust gas not converted by or emitted from the GPF, especially when the GPF is regenerated. Thus, the overall system can provide an efficient removal of pollutants.

Even further, the TWC2 is located relatively far from the gasoline engine. Thus, the TWC2 is subjected to and frequently operated at lower temperatures than the other upstream devices. Consequently, the TWC2 is less affected by aging and concomitant deterioration of catalyst performance. Thus, since the catalytic efficiency of the TWC2 can be relatively stable, it can be advantageous to provide the TWC2 with a relatively high amount of wash coat.

In a preferred embodiment, the wash coat load (WCL) of the TWC2 is from 100 g/l to 300 g/l, preferably from 150 g/l to 280 g/l, more preferably from 175 g/l to 260 g/l. When the WCL of the TWC2 is adjusted accordingly, a relatively good overall removal of pollutants with the catalytic system is possible. Overall, the catalyst is used efficiently, because the TWC2 is located far away from the engine and less affected by aging than the GPF or TWC1. Further, such amounts of wash coat are suitable for providing an effective finishing of the pre-purified exhaust gas emitted from the GPF, whereby residual pollutants are removed.

In a preferred embodiment, the wash coat load (WCL) of the GPF is from 0 g/l to 150 g/l, preferably from 30 g/l to 130 g/l, more preferably from 50 g/l to 110 g/l. When adapting the WCL of the GPF in such relatively low ranges, the pressure drop can be adjusted to be low. Further, the overall amount of catalyst in the system can be kept relatively low. The GPF, which is coated with a relatively low amount of wash coat, can efficiently remove residual pollutants from the TWC1, which comprises a relatively high WCL.

In a preferred embodiment, the wash coat load (WCL) of the TWC1 is from 150 g/l to 350 g/l, preferably from 180 g/l to 310 g/l, more preferably from 200 g/l to 280 g/l. When the WCL of the TWC1 is used in such relatively high amounts, a good combination of high catalytic performance of the TWC1 with efficient removal of residual pollutants by the GPF and TWC2 is provided. It is also advantageous that the WCL of the TWC1 is adjusted within these relatively high ranges, because the TWC1 is located closest to the gasoline engine. Thus, it is heated more rapidly than the downstream devices and achieves the high optimal operation temperature more often and for longer time periods. Further, a high WCL typically confers higher aging stability to the TWC1, which is especially advantageous when the TWC1 is closed coupled to the engine and thus operated at higher temperatures Therefore, a relatively high wash coat load of the TWC1 can be advantageous for an effective initial and also total removal of pollutants. Overall, by adapting the WCL of the devices accordingly, an efficient use of total catalyst can be adjusted.

Further, a relatively high catalytic efficiency of the TWC1 can be advantageous for diagnosis capability. Especially during on-board diagnosis, the catalytic performance is commonly carried out by monitoring the first catalytic device in the system. When the wash coat load and catalytic performance of the TWC1 is relatively high, on-board diagnosis can provide relatively good results in approximation when monitoring only the TWC1. Thereby, a relatively good correlation of the diagnosis result with real driving emissions is possible.

In a preferred embodiment, the wash coat load (WCL) of the TWC1 is greater than the WCL of the TWC2, wherein the WCL is determined in g/l of the volume of the device. This can be advantageous, because the upstream TWC1, which is located close to the gasoline engine, can be operated more efficiently and more often at a high temperature and achieves a greater catalytic efficiency at high operation temperature. Since the TWC2 only removes residual pollutants, it is appropriate that the WCL is lower than of the TWC1. However, it can be advantageous that a downstream TWC2 is present, which removes pollutants from the TWC1 and GPF, and which is less affected by aging than the TWC1. In the overall system, it can be advantageous that on-board diagnosis can be performed with the TWC1 and provides a reasonable correlation to total emissions. Overall, the TWC1 and TWC2 complement each other in the system and provide, together with the GPF between them, an unexpected combination of high filtration efficiency, high catalytic efficiency and low pressure drop.

In one embodiment, the wash coat of the TWC1 is the same as for the TWC2. This means that the oxides comprised and concentrations thereof are the same in both wash coats. In another embodiment, the TWC1 and TWC2 comprise different wash coats.

TWC catalysts include oxygen storage materials (OSM) such as ceria that have multi-valent states which allows oxygen to be held and released under varying air to fuel ratios. Under rich conditions, when $NO_x$ is being reduced, the OSM provide a small amount of oxygen to consume unreacted CO and HC. Likewise, under lean conditions when CO and HC are oxidized, the OSM reacts with excess oxygen and/or $NO_x$. As a result, even in the presence of an atmosphere that oscillates between fuel-rich and fuel-lean air to fuel ratios, there is conversion of HC, CO, and $NO_x$ all at the same (or at essentially all the same) time.

In a preferred embodiment, the oxygen storage capacity (OSC) of the TWC2 is greater than the OSC of the GPF, wherein the OSC is determined in mg/l of the volume of the device in fresh state. This can be advantageous, because the TWC2 is located more distant from the gasoline engine and thus is generally receiving less heat from the gasoline engine. Therefore, the TWC2 is less affected by aging and concomitant undesired decrease of catalytic efficiency. When the OSC of the TWC2 is higher than of the GPF, an efficient continuous final removal of residual pollutants from the GPF can be achieved even at a relatively low temperature.

Further, a relatively high OSC of the TWC2 can be advantageous, because emissions of CO and $NO_x$ from the GPF can be relatively high at least temporarily. Thus, it can be advantageous to efficiently control the oxygen level in the TWC2, such that relatively large amounts of oxygen can be stored in or released into the TWC2 to remove residual pollutants under different operation conditions. This can especially be advantageous when the GPF is regenerated. Gasoline particulate filters have to be regenerated at repetitive time intervals if their operating temperature is not sufficient for passive soot oxidation. During regeneration, the soot which has accumulated in the GPF since the last regeneration procedure is oxidized and converted into carbon dioxide. However, the conversion is often not quantitative, and significant amounts of side products such as CO and HC can also be formed in the GPF. To remove these in the downstream TWC2, a significant amount of additional oxygen may be required within a relatively short time window. A relatively high OSC in the TWC2 can provide sufficient oxygen to remove such pollutants also during regeneration of the GPF.

Even further, a high OSC in the TWC2 can be advantageous for efficient removal of residual $NO_x$ under lean operation conditions. A TWC2 having a high OSC can bind a large amount of oxygen under lean operation conditions. If the OSC would be too low, too much unbound oxygen can be present under lean conditions and the reduction of $NO_x$ to $N_2$ can be impaired.

Moreover, a relatively low OSC of the GPF can be advantageous, because less catalyst coating can be provided in the GPF, which correlates with a relatively low pressure drop in the GPF. Overall, a good combination of high filtration efficiency, high catalytic efficiency and low pressure drop can be achieved when adjusting the OSC of the TWC2 and GPF accordingly.

In a preferred embodiment, the oxygen storage capacity (OSC) of the TWC1 is higher than the OSC of the GPF, wherein the OSC is determined in mg/l of the volume of the device in fresh state. In a preferred embodiment, the OSC of the TWC1 is at least 40% greater than the OSC of the GPF. A higher OSC of the TWC1 can be advantageous, because it can support a relatively high catalytic efficiency of the TWC1. The TWC1 is located closest to the gasoline engine and thus is operated more frequently at optimal high temperature than the downstream GPF, and especially than the even more remote TWC2. Therefore, an efficient catalytic reaction can occur more easily and more frequently in the TWC1 than in the downstream devices. In the overall system, it can be generally advantageous if a relatively high catalytic turnover is mediated by the TWC1. Then, residual pollutants emitted from the TWC1 can be removed by the downstream devices, which can have a lower OSC.

Moreover, a relatively high OSC of the TWC1 can be advantageous when the engine is operated alternately under rich operation conditions with lambda<1 and lean operation conditions with lambda>1 for short intervals of time. Such an operation mode is known as wobbling or as wobble operation. In a wobbling mode, a high OSC can be advantageous, because oxygen can be efficiently stored under lean operation conditions and released into the reaction under rich operation conditions. Accordingly, a high OSC in the TWC1 supports an efficient overall removal of pollutants under such conditions. In contrast, a high OSC of the GPF is less relevant for operation under wobble conditions, because the major portion of the pollutants was already removed in the TWC1, such that the absolute concentrations of the pollutants are comparably low in the GPF.

Even further, a high OSC in the TWC1 can be advantageous for efficient removal of $NO_x$ under lean operation conditions. A TWC1 having a high OSC can bind a large amount of oxygen under lean operation conditions. If the OSC would be too low, too much unbound oxygen can be present under lean conditions, and the reduction of $NO_x$ to $N_2$ can be impaired.

Further, a high OSC in the TWC1 can be advantageous for diagnosis capability. Especially on-board diagnosis is commonly carried out with the first catalytic device. When the upstream TWC1 has a high catalytic efficiency, the result of on-board diagnosis at the TWC1 will provide a reasonable indication of final emissions or real driving emissions (RDE).

In a preferred embodiment, the oxygen storage capacity (OSC) of the TWC1 is from 400 mg to 1250 mg, preferably from 500 mg to 900 mg. This can be advantageous, because a high catalytic efficiency can be achieved at the TWC1 when the OSC is adjusted accordingly. As outlined above, this can be advantageous for overall catalytic efficiency, operation in the wobbling mode and diagnosis capability.

In a preferred embodiment, the ratio $V_{cat}/V_{eng}$ is at least 1, wherein $V_{cat}$ is the total catalyst volume of all devices and $V_{eng}$ is the engine displacement of the gasoline engine. Thus, the total catalyst volume is at least the sum of the volumes of the TWC1, TWC2 and GPF. As used herein, the catalyst volume of a device is the overall volume, and not only the internal void volume. A ratio of 1 or more is advantageous, because a relatively high catalyst volume of all devices can provide a high catalytic performance. The volume of the engine can approximately be correlated to the amount of exhaust gas emitted during operation. If the total catalyst volume would be smaller than the engine volume, the efficiency of the exhaust gas purification system can be too low, especially under high mass flows that are observed under real driving conditions. In order to achieve a high catalytic efficiency, a relatively high catalyst concentration may then have to be provided in the catalytic devices, which could lead to an undesired increase of the pressure drop.

In a preferred embodiment, the ratio $V_{cat}/V_{eng}$ is from 1 to 5, preferably from 1.1 to 4, more preferably from 1.2 to 3.5. If the catalyst volume would be higher, the heat transfer from the gasoline engine to the catalytic devices could become insufficient. Generally, an efficient heat transfer from the gasoline engine to the downstream catalytic devices is required, such that the devices can attain the optimal high operation temperature. Typically, such catalytic devices are operated at a temperature of several hundred degrees Celsius for an optimal performance and catalytic conversion. If the temperature is below the optimal temperature, the catalytic turnover can be decreased. Further, a compact integration of the catalytic system into a vehicle is difficult, when the total catalytic volume is too high.

In a preferred embodiment, the volume of the TWC1 ($V_{TWC1}$) is from 20% to 50%, preferably from 30% to 40%, of the total catalyst volume $V_{cat}$. In this embodiment, it is preferred that the volume of the TWC1 is larger than the volume of the TWC2. Overall, a relatively high volume of the TWC1 can be advantageous, because the TWC1 can be provided with a relatively high catalytic efficiency. Accordingly, a major portion of the gaseous pollutants from the gasoline engine can be removed in the TWC1, which is located relatively close to the engine and attains a relatively high temperature more easily and frequently. This is especially advantageous for efficient removal of pollutants under dynamic driving conditions, for example in urban traffic or after a cold start of the engine. Further, diagnosis capability, especially for on-board diagnosis of catalytic efficiency, is usually carried out at the upstream device, in this case the TWC1. Therefore, a high efficiency of the TWC1 allows relatively good monitoring of the overall catalytic efficiency.

In a preferred embodiment, the volume of the GPF ($V_{GPF}$) is from 30% to 60%, preferably from 40% to 55%, of the total catalyst volume $V_{cat}$. In a specific embodiment, the total volume of the GPF is larger than the total volume of the TWC1 and/or of the TWC2. A relatively high volume of the GPF can be advantageous, because a relatively high volume can be associated with a relatively low pressure drop. If the volume of the GPF would be too low, the pressure drop could increase, which could yield to inefficient operation of the engine and increased carbon dioxide emissions. A relatively high volume of the GPF can be especially advantageous, if the GPF is a catalytic GPF, which is provided with a catalyst wash coat, preferably a TWC washcoat, which reduces the void volume in the device through which the exhaust gas can flow. A relatively high volume of the GPF can also be advantageous for efficient storage of particles and for efficient regeneration, when accumulated soot particles are removed under oxidizing conditions.

In a preferred embodiment, the volume of the TWC2 ($V_{TWC2}$) is from 10% to 40%, preferably from 15% to 35%, of the total catalyst volume $V_{cat}$. A lower volume of the TWC2, when compared to the TWC1 and/or GPF, can be advantageous, because removal of residual pollutants from the GPF may require less catalyst and thus catalyst volume in the TWC2. Therefore, an efficient overall system can be provided at relatively low costs and with favourable distribution of catalyst throughout the three devices.

In a preferred embodiment, the ratio of the smallest diameter of the GPF to the length of the GPF is from 0.7 to 3, preferably from 0.75 to 1.6. When the dimensions of the GPF are adjusted accordingly, a relatively efficient particle filtration and catalyst performance could be achieved while maintaining a relatively low backpressure.

In a highly preferred embodiment, the system comprises a turbocharger positioned upstream from the TWC1. A turbocharger is a turbine-driven forced induction device that increases an internal combustion engine's efficiency and power output by forcing extra air into the combustion chamber. Therefore, a more efficient exhaust gas purification system can be required if a turbocharger is present. The highly efficient inventive catalytic system is especially suitable for purifying exhaust gas from a gasoline engine and a turbocharger. Preferably, the turbocharger is the only additional device between the gasoline engine and the TWC1.

Preferably, the distance from the outlet surface of the turbocharger to the inlet surface of the TWC1 is from 1 cm to 40 cm, preferably from 2 cm to 30 cm, more preferably from 2 cm to 20 cm. Preferably, the distance is less than 10 cm or less than 5 cm. When the dimensions of the turbocharger and TWC1 are adapted accordingly, a close-coupled operation of the TWC1 with the gasoline engine is possible. Then, heat can be transferred more rapidly and efficiently from the engine to the TWC1 and downstream catalyst devices. This can be advantageous, because the catalytic reaction in the TWC1 and downstream devices is generally more efficient at high temperature. Further, rapid heat transfer supports an efficient catalytic reaction after cold-start and under dynamic driving conditions, for example in urban traffic. Moreover, a close-coupled system can be integrated directly in the space behind the gasoline engine. Accordingly, it is not necessary to integrate the TWC1, or downstream catalytic devices which are also close-coupled, into the underbody of a vehicle. Thereby, a compact integrated catalyst system can be provided. Further, close-coupling of the TWC1 and the GPF to the engine generally can also provide a higher catalytic efficiency of the GPF and more efficient regeneration of the GPF.

In a preferred embodiment, the distance of the outlet surface of the TWC1 to the inlet surface of the GPF is from 1 cm to 60 cm, preferably from 2 cm to 50 cm, more preferably from 3 cm to 40 cm. Preferably, the distance is less than 20 cm or less than 10 cm. When keeping the distance between the TWC1 and GPF relatively short, a close-coupled connection of the GPF with the gasoline engine is possible. Thereby, heat can be transferred more efficiently and rapidly into the GPF, but also the downstream TWC2. Further, the GPF can be integrated more compactly into a vehicle. Further, the catalyst system can be regenerated more efficiently at high temperature and can have a higher catalytic turnover.

In a preferred embodiment, the distance of the outlet surface of the GPF to the inlet surface of the TWC2 is from 0 cm to 120 cm, preferably from 1 cm to 110 cm, more preferably from 2 cm to 100 cm. Preferably, the distance is less than 20 cm or less than 10 cm. Thereby, a close-coupled system is obtainable with additional advantages as described above. Overall, it is preferred that all devices of the system are close-coupled to each other and to the gasoline engine.

In a preferred embodiment, the TWC1 comprises at least two different wash coat layers. In a further preferred embodiment, the TWC2 comprises one or two different wash coat layers. Preferably, the wash coat layers are laid over each other. In a preferred embodiment, different wash coat layers can be located at different surfaces of the porous walls of the GPF. When combining different wash coat layers, catalytic coatings can be combined which have different catalytic efficiency, resulting in an overall system which is effective in removing different fractions of pollutants.

In a further embodiment, the catalytic efficiency of the TWC1 is greater than that of the GPF with regard to removal of $NO_x$, CO and/or hydrocarbons, when performance of the GPF is determined under the same conditions as for the TWC1. This means that the performance of the GPF is determined without the upstream TWC1. This can be advantageous, because the TWC1 is closer to the engine and can be operated more efficiently at a higher temperature. Further, a high wash coat load in the TWC1 affects pressure drop less significantly than high wash coat load in the GPF, because the exhaust gas in the TWC1 does not have to traverse monolith filter walls.

In a further embodiment, the catalytic performance of the GPF is greater than that of the TWC2 with regard to removal of $NO_x$, CO and/or hydrocarbons, when performance of the TWC2 is determined under the same conditions as for the GPF. This means that the performances of the GPF and TWC2 are determined without further upstream exhaust gas purification devices. This can be advantageous, because the levels of gaseous pollutants in the GPF can be higher than in the pre-purified exhaust gas which enters the TWC2. Accordingly, relatively efficient removal of pollutants in the GPF can be combined with final removal of residual pollutants in the TWC2. Overall, a system can be provided with effective combination and adaptation of filtration efficiency, TWC efficiency and low pressure drop in the three devices, with a highly efficient distribution of the catalytic material throughout the catalyst system.

Preferably, the purified exhaust gas emitted from the TWC2 comprises the following levels of pollutants (in mg/km):

CO: less than 1000, preferably less than 500, more preferably less than 300

THC: less than 100, preferably less than 50, more preferably less than 30

$NO_x$: less than 60, preferably less than 40, more preferably less than 30

PM: less than 0.005, preferably less than 0.002, more preferably less than 0.001

Preferably, the particle number (PN) is less than $6 \times 10^{11}$, preferably less than $5 \times 10^{11}$.

Preferably, these pollutant levels are determined according to the standard tests defined in EURO6, test cycle WLTP (see EU commission regulation 2007/715 and 2008/692 and regulations based thereon 2017/1151, 2017/134).

Subject of the invention is also a method for purifying exhaust gas emitted from a gasoline engine, comprising the steps of:
(a) providing a gasoline engine and an exhaust gas purification system of the invention, and
(b) passing exhaust gas emitted from the gasoline engine through the system, such that the exhaust gas is purified by the system.

As outlined above, method uses the exhaust gas purification system as described above, which is suitable for gasoline engines. It is adapted to the specific exhaust gas and pollutants emitted from gasoline engines, which is different than exhaust gas from diesel engines.

Subject of the invention is also the use of the inventive exhaust gas purification system for purifying exhaust gas from a gasoline engine.

The invention comprises the following embodiments:

1. An exhaust gas purification system for a gasoline engine, comprising in consecutive order the following devices:
   a first three-way-catalyst (TWC1), a gasoline particulate filter (GPF) and a second three-way-catalyst (TWC2),
   wherein the platinum-group metal concentration (PGM) of the TWC2 is greater than the PGM of the GPF, wherein the PGM is determined in g/ft3 of the volume of the device.
2. The system according to embodiment 1, wherein the ratio of the platinum-group metal concentration (PGM) of the TWC1 to the PGM of the TWC2 is from 1.1 to 10, preferably from 1.25 to 9, more preferably from 1.45 to 5, wherein the PGM is determined in g/ft3 of the volume of the device.
3. The system according to at least one of the preceding embodiments, wherein the platinum-group metal concentration (PGM) of the TWC1 is at least 40% greater than the PGM of the TWC2, wherein the PGM is determined in g/ft3 of the volume of the device.
4. The system according to at least one of the preceding embodiments, wherein the platinum-group metal concentration (PGM) of the TWC1 is greater than the sum of the PGM of the GPF and TWC2, wherein the PGM is determined in g/ft3 of the volume of the device.
5. The system according to at least one of the preceding embodiments, wherein the total amount of platinum-group metal of the TWC1 is from 1 g to 15 g.
6. The system according to at least one of the preceding embodiments, wherein the total amount of platinum-group metal of the GPF is from 0 g to 5 g, preferably from 0.05 g to 5 g.
7. The system according to at least one of the preceding embodiments, wherein the total amount of platinum-group metal of the TWC2 is from 0.1 g to 8 g.
8. The system according to at least one of the preceding embodiments, wherein the TWC1 comprises palladium and/or rhodium.
9. The system according to at least one of the preceding embodiments, wherein the TWC2 comprises palladium and/or rhodium.
10. The system according to at least one of the preceding embodiments, wherein the percentage of rhodium of the total amount of platinum-group metal of the TWC2 is at least 10 wt. %.
11. The system according to at least one of the preceding embodiments, wherein the TWC2 does not comprise platinum.
12. The system according to at least one of the preceding embodiments, wherein the wash coat load (WCL) of the TWC2 is greater than the WCL of the GPF, wherein the WCL is determined in g/l of the volume of the device.
13. The system according to at least one of the preceding embodiments, wherein the wash coat load (WCL) of the TWC2 is from 100 g/l to 300 g/l, preferably from 150 g/l to 280 g/l, more preferably from 175 g/l to 260 g/l.
14. The system according to at least one of the preceding embodiments, wherein the wash coat load (WCL) of the GPF is from 0 g/l to 150 g/l, preferably from 30 g/l to 130 g/l, more preferably from 50 g/l to 110 g/l.
15. The system according to at least one of the preceding embodiments, wherein the wash coat load (WCL) of the TWC1 is from 150 g/l to 350 g/l, preferably from 180 g/l to 310 g/l, more preferably from 200 g/l to 280 g/l.
16. The system according to at least one of the preceding embodiments, wherein the wash coat load (WCL) of the TWC1 is greater than the WCL of the TWC2, wherein the WCL is determined in g/l of the volume of the device.
17. The system according to at least one of the preceding embodiments, wherein the oxygen storage capacity (OSC) of the TWC2 is greater than the OSC of the GPF, wherein the OSC is determined in mg/l of the volume of the device.
18. The system according to at least one of the preceding embodiments, wherein the oxygen storage capacity (OSC) of the TWC1 is greater than the OSC of the TWC2, wherein the OSC is determined in mg/l of the volume of the device.
19. The system according to at least one of the preceding embodiments, wherein the oxygen storage capacity (OSC) of the TWC1 is from 400 mg to 1250 mg, preferably from 500 mg to 900 mg.
20. The system according to at least one of the preceding embodiments, wherein the ratio $V_{cat}/V_{eng}$ is at least 1, wherein $V_{cat}$ is the total catalyst volume of all devices and $V_{eng}$ is the engine displacement of the gasoline engine.
21. The system according to at least one of the preceding embodiments, wherein the ratio $V_{cat}/V_{eng}$ is from 1 to 5, preferably from 1.1 to 4, more preferably from 1.2 to 3.5.
22. The system according to at least one of the preceding embodiments, wherein the volume of the TWC1 ($V_{TWC1}$) is from 20% to 50% of the total catalyst volume $V_{cat}$, preferably from 30% to 40%.
23. The system according to at least one of the preceding embodiments, wherein the volume of the GPF ($V_{GPF}$) is from 30% to 60% of the total catalyst volume $V_{cat}$, preferably from 40% to 55%.
24. The system according to at least one of the preceding embodiments, wherein the volume of the TWC2 ($V_{TWC2}$) is from 10% to 40% of the total catalyst volume $V_{cat}$, preferably from 15% to 35%.
25. The system according to at least one of the preceding embodiments, wherein the ratio of the smallest diameter of the GPF to the length of the GPF is from 0.7 to 3, preferably from 0.75 to 1.6.
26. The system according to at least one of the preceding embodiments, wherein the system comprising a turbocharger positioned upstream of the TWC1, wherein the distance of the outlet surface of the turbocharger to the inlet surface of the TWC1 is from 1 cm to 40 cm, preferably from 2 cm to 30 cm, more preferably from 2 cm to 20 cm.
27. The system according to at least one of the preceding embodiments, wherein the distance of the outlet surface of the TWC1 to the inlet surface of the GPF is from 1 cm to 60 cm, preferably from 2 cm to 50 cm, more preferably from 3 cm to 40 cm.
28. The system according to at least one of the preceding embodiments, wherein the distance of the outlet surface of the GPF to the inlet surface of the TWC2 is from 0 cm to 120 cm, preferably from 1 cm to 110 cm, more preferably from 2 cm to 100 cm.
29. The system according to at least one of the preceding embodiments, wherein the TWC1 comprises at least two different wash coat layers.
30. The system according to at least one of the preceding embodiments, wherein the TWC2 comprises one or two different wash coat layers.
31. The system according to at least one of the preceding embodiments, wherein the catalytic performance of the TWC1 is greater than that of the GPF with regard to removal of $NO_x$, CO and/or hydrocarbons, when performance of the GPF is determined under the same conditions as for the TWC1.
32. The system according to at least one of the preceding embodiments, wherein the catalytic performance of the GPF is greater than that of the TWC2 with regard to removal of $NO_x$, CO and/or hydrocarbons, when performance of the TWC2 is determined under the same conditions as for the GPF.
33. A method for purifying exhaust gas emitted from a gasoline engine, comprising the steps of:
  (a) providing a gasoline engine and an exhaust gas purification system of any of the preceding embodiments, and
  (b) passing exhaust gas emitted from the gasoline engine through the system, such that the exhaust gas is purified in the system.
34. Use of an exhaust gas purification system of any of the preceding embodiments for purifying exhaust gas from a gasoline engine.

The invention claimed is:
1. An exhaust gas purification system for a gasoline engine, comprising in consecutive order the following devices:
  a first three-way-catalyst (TWC1), a gasoline particulate filter (GPF) and a second three-way-catalyst (TWC2),
  wherein the platinum-group metal concentration (PGM) of the TWC2 is greater than the PGM of the GPF, wherein the PGM is determined in g/ft3 of the volume of the device, and
  wherein the oxygen storage capacity (OSC) of the TWC1 is greater than the OSC of the TWC2, wherein the OSC is determined in mg/l of the volume of the device, and
  wherein the GPF and TWC2 devices are different units.
2. The system according to claim 1, wherein the ratio of the platinum-group metal concentration (PGM) of the TWC1 to the PGM of the TWC2 is from 1.1 to 10, wherein the PGM is determined in g/ft3 of the volume of the device.
3. The system according to claim 1, wherein the platinum-group metal concentration (PGM) of the TWC1 is at least 40% greater than the PGM of the TWC2, wherein the PGM is determined in g/ft3 of the volume of the device.
4. The system according to claim 1, wherein the total amount of platinum-group metal of the TWC2 is from 0.1 g to 8 g.
5. The system according to claim 1, wherein the TWC1 comprises palladium and/or rhodium and/or wherein the TWC2 comprises palladium and/or rhodium.
6. The system according to claim 1, wherein the percentage of rhodium of the total amount of platinum-group metal of the TWC2 is at least 10 wt. %.
7. The system according to claim 1, wherein the wash coat load (WCL) of the TWC2 is greater than the WCL of the GPF, wherein the WCL is determined in g/l of the volume of the device.
8. The system according to claim 1, wherein the wash coat load (WCL) of the TWC2 is from 100 g/l to 300 g/l.
9. The system according to claim 1, wherein the wash coat load (WCL) of the GPF is from 0 g/l to 150 g/l.
10. The system according to claim 1, wherein the wash coat load (WCL) of the TWC1 is from 150 g/l to 350 g/l, and/or
  wherein the wash coat load (WCL) of the TWC1 is greater than the WCL of the TWC2,
  wherein the WCL is determined in g/l of the volume of the device.
11. The system according to claim 1, wherein the oxygen storage capacity (OSC) of the TWC2 is greater than the OSC of the GPF, wherein the OSC is determined in mg/l of the volume of the device.
12. The system according to claim 1, wherein an oxygen storage capacity (OSC) of the TWC1 is from 400 mg to 1250 mg.
13. The system according to claim 1, wherein the ratio $V_{cat}/V_{eng}$ is at least 1, wherein $V_{cat}$ is the total catalyst volume of all devices and $V_{eng}$ is the engine displacement of the gasoline engine.
14. The system according to claim 1, wherein the ratio of the platinum-group metal concentration (PGM) of the TWC1 to the PGM of the TWC2 is from 1.45 to 5.
15. The system according to claim 1, wherein the wash coat load (WCL) of the TWC2 is from 175 g/l to 260 g/l.
16. The system according to claim 1, wherein the wash coat load (WCL) of the GPF is from 50 g/l to 110 g/l.
17. The system according to claim 1, wherein the wash coat load (WCL) of the TWC1 is from 200 g/l to 280 g/l.
18. The system according to claim 1, wherein the oxygen storage capacity (OSC) of the TWC1 is from 500 mg to 900 mg.
19. The system according to claim 1, wherein each of the TWC1, the GPF and the TWC2 devices are different units.
20. The system according to claim 1, wherein the TWC1, the GPF and the TWC2 are different units that are each provided in a separate housing.
21. An exhaust gas purification system for a gasoline engine, comprising in consecutive order the following devices:
  a first three-way-catalyst (TWC1), a gasoline particulate filter (GPF) and a second three-way-catalyst (TWC2),
  wherein a platinum-group metal concentration (PGM) of the TWC2 is greater than a PGM of the GPF, wherein the PGM is determined in g/ft3 of the volume of the device, and wherein an oxygen storage capacity (OSC) of the TWC1 is greater than an OSC of the TWC2, wherein the OSC is determined in mg/l of a volume of the device, and wherein the platinum-group metal concentration (PGM) of the TWC1 is greater than the sum of the PGM of the GPF and TWC2, wherein the PGM is determined in g/ft3 of the volume of the device.
22. An exhaust gas purification system for a gasoline engine, comprising in consecutive order the following devices:

a first three-way-catalyst (TWC1), a gasoline particulate filter (GPF) and a second three-way-catalyst (TWC2), wherein the platinum-group metal concentration (PGM) of the TWC2 is greater than the PGM of the GPF, wherein the PGM is determined in g/ft3 of the volume of the device, wherein the oxygen storage capacity (OSC) of the TWC1 is greater than the OSC of the TWC2, wherein the OSC is determined in mg/l of the volume of the device, and wherein the OSC of the TWC1 ranges from 400 mg to 1250 mg, and wherein the OSC of the TWC2 is greater than the OSC of the GPF wherein the wash coat load (WCL) of the TWC1 is greater than the WCL of each of the GPF and the TWC2, wherein the WCL is determined in g/l of the volume of the device, and wherein the GPF and TWC2 devices are different units.

23. The system according to claim 22, wherein the different units are provided in separate housings.

* * * * *